United States Patent [19]

Yokota

[11] Patent Number: 5,229,259
[45] Date of Patent: Jul. 20, 1993

[54] SILVER HALIDE PHOTOGRAPHIC MATERIAL

[75] Inventor: Minoru Yokota, Ashigara, Japan

[73] Assignee: Fuji Photo Film Co., Ltd., Kanagawa, Japan

[21] Appl. No.: 743,637

[22] Filed: Aug. 12, 1991

[30] Foreign Application Priority Data

Aug. 13, 1990 [JP] Japan .................. 2-214059

[51] Int. Cl.$^5$ .................................. G03C 1/76
[52] U.S. Cl. .......................... 430/523; 430/39; 430/140; 430/22; 430/536; 430/539; 430/531; 428/692; 428/694 R; 252/62.56; 252/62.58
[58] Field of Search .............. 430/39, 140, 22, 536, 430/539, 531, 523; 428/692, 694; 252/62.56, 62.58

[56] References Cited

U.S. PATENT DOCUMENTS

| | | | |
|---|---|---|---|
| 3,782,947 | 1/1974 | Krall | 430/132 |
| 4,279,945 | 7/1981 | Audran et al. | 430/140 |
| 4,302,523 | 11/1981 | Audran et al. | 430/140 |
| 4,713,297 | 12/1987 | Verbunt | 428/692 |
| 5,030,332 | 7/1991 | Henderson et al. | 428/692 |
| 5,102,732 | 4/1992 | Goto et al. | 428/694 |
| 5,147,768 | 9/1992 | Sakakibara | 430/39 |

FOREIGN PATENT DOCUMENTS

| | | | |
|---|---|---|---|
| 0005804 | 1/1982 | Japan | 252/62.58 |
| 0023505 | 2/1984 | Japan | 252/62.58 |
| 3064306 | 3/1988 | Japan | 252/62.58 |

Primary Examiner—Richard L. Schilling
Assistant Examiner—Thomas R. Neville
Attorney, Agent, or Firm—Sughrue, Mion, Zinn, Macpeak & Seas

[57] ABSTRACT

Disclosed is a silver halide photographic material comprising a silver halide emulsion layer on at least one side of a support and at least one magnetic recording layer on at least one side of the support, and the magnetic recording layer is transparent and comprises a ferromagnetic powder, a silica and alumina co-precipitate on the surface of the ferromagnetic powder, and a binder.

9 Claims, No Drawings

SILVER HALIDE PHOTOGRAPHIC MATERIAL

FIELD OF THE INVENTION

The present invention relates to a silver halide photographic material comprising a transparent magnetic recording layer.

BACKGROUND OF THE INVENTION

Heretofore, silver halide photographic materials have been substantially incapable of accepting input of various data for picture taking (e.g., date of picture taking, weather, enlargement ratio and number of prints) and only capable of accepting an optical input of the date of picture taking.

Further, the prior art silver halide photographic materials have been totally incapable of accepting input of their own data, thereby drastically hindering high speed operation and cost reduction.

Inputting various data into light-sensitive materials is an important means for improving and further simplifying the convenience of cameras. An example of such a data inputting means is a magnetic recording method, which advantageously enables arbitrary input and output of data at a low cost.

For example, U.S. Pat. Nos. 3,782,947, 4,279,945, and 4,302,523 propose that the back surface of a light-sensitive material comprising a transparent support be coated with a magnetic recording layer which exhibits a necessary transparency for light-sensitive material upon picture taking and does not affect the granularity of a light-sensitive material by properly selecting the amount and size of magnetizable grains contained in the magnetic recording layer. The system of inputting a signal into a magnetic recording layer is disclosed in World Patent Disclosure Nos. 90-4205 and 90-04212.

The provision of such a magnetic recording layer and a system of inputting and outputting signal into a magnetic recording layer enables the incorporation of various data into a light-sensitive material, which has been heretofore difficult to perform. For example, various conditions such as those for picture taking (e.g., date of picture taking, weather, illumination condition and reduction/enlargement ratio) and those upon development and printing (e.g., number of reprints, portions to be zoomed and messages) can be inputted to or outputted from the magnetic layer on the light-sensitive material. Further, it can be expected in the future that the magnetic recording layer can be used as a signal input/output means in a system wherein a signal is outputted directly from a light-sensitive material to a television/video equipment for picture display.

However, the use of magnetic powder as described in the above-cited patents causes many disadvantages. For example, the magnetic powders exhibit poor wetting with a binder medium or cause magnetic agglomeration among grains. This makes it difficult to disperes uniformly the powder in a binder resin. Even when a mechanical dispersion is effected, if the binder resin is used in an amount larger than that of the magnetic powder, agglomeration can occur or the magnetic properties of the magnetic recording medium can be reduced. In particular, if a binder mainly comprising a polyurethane resin is used, the above-mentioned tendency becomes remarkable. Further, even if it is attempted to form a photographically transparent magnetic recording layer which is an object of the present invention, the resulting layer is not transparent due to the presence of agglomerate of magnetic materials.

SUMMARY OF THE INVENTION

It is therefore an object of the present invention to provide a photographic light-sensitive material comprising a transparent magnetic recording layer having a uniform dispersion in a binder resin.

The above and other objects of the present invention will become more apparent from the following detailed description and examples.

The above object of the present invention is accomplished with a silver halide photographic material comprising a silver halide emulsion layer on at least one side of a support, comprising at least one magnetic recording layer on at least one side of the support, said magnetic recording layer is transparent and comprises a ferromagnetic powder, a silica and alumina co-precipitate on the surface of the ferromagnetic powder, and a binder.

DETAILED DESCRIPTION OF THE INVENTION

The present invention will be described further hereinafter.

The present invention will be first described with reference to the magnetic recording layer to be used in the present invention.

The magnetic recording layer preferably have a coercive force of 400 Oe or more from the point of view of retaining the magnetic recording during user's handling. The ferromagnetic powder having a coercive force of about 300 Oe or more is preferably used to provide the magnetic recording layer having a coercive force of 400 Oe or more.

Examples of the ferromagnetic powder used in the present invention include ferromagnetic iron oxide fine powder, Co-doped ferromagnetic iron oxide fine powder, ferromagnetic chromium dioxide fine powder, ferromagnetic metal powder, ferromagnetic alloy powder and barium ferrite. In the present invention, the ferromagnetic powder is used in the form of those having co-precipitated silica and alumina on the surface thereof.

Examples of ferromagnetic alloy powder include ferromagnetic alloy comprising 75 wt. % or more of metallic content wherein 80 wt. % or more thereof consists of at least one ferromagnetic metal or alloy (e.g., Fe, Co, Ni, Fe-Co, Fe-Ni, Co-Ni, Co-Fe-Ni) and 20 wt. % or less thereof consists of other components (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te and Bi). Alternatively, the ferromagnetic metal content may comprise a small amount of water, hydroxide or oxide.

The shape and size of the ferromagnetic powder are not limited specifically and can be selected widely. The ferromagnetic powder may be needle-shaped, grain-shaped, spherical, cubic or tabular, preferably needle-shaped or tabular in view of electromagnetic conversion. The crystal size and specific surface area of the ferromagnetic powder are not limited specifically. The crystal size of the ferromagnetic powder is preferably in the range of 400 Å or less and the specific surface area ($S_{BET}$) of the ferromagnetic powder is preferably in the range of 20 m²/g or more, particularly 30 m²/g or more. The pH of the ferromagnetic powder is not limited specifically and is preferably in the range of 5 to 10. In the case of ferromagnetic iron oxide fine powder, the ratio of ferrous/ferric is not limited specifically. The magnetic recording layers are described further in JP-A-47-32812 and 53-109604 (the term "JP-A" as used herein means an "unexamined published Japanese patent application").

The total amount of the ferromagnetic powder and the silica and alumina co-precipitate on the surface thereof is in the range of $4 \times 10^{-4}$ g to 3 g, preferably $10^{-3}$ g to 1 g, and more preferably $4 \times 10^{-3}$ to $4 \times 10^{-1}$ g per m$^2$ of the support.

The ferromagnetic powder having co-precipitated silica and alumina will be described further hereinafter.

The silica-alumina co-precipitate to be present on the surface of the ferromagnetic powder of the present invention is a hydrous aluminum silicate or a composite hydrous oxide of aluminum and silicon. The silica-alumina co-precipitate may cover the surface of the ferromagnetic powder in a continuous film or may cover partially or entirely the surface of the ferromagnetic powder in a discontinuous film. The molar ratio of $Al_2O_3$: $SiO_2$ in the silica-alumina co-precipitate may be selected widely but is preferably in the range of 1:2 to 1:4.

The amount of the silica-alumina co-precipitate to be coated on the surface of the ferromagnetic powder is in the range of 0.05 to 10%, and preferably 0.1 to 2% as calculated in terms of $SiO_2$, or in the range of 0.03 to 9%, and preferably 0.05 to 1.7% as calculated in terms of $Al_2O_3$, based on the weight of ferromagnetic powder. If the value falls below the above-specified range, there is a possibility that the desired dispersing effect cannot be obtained, making it impossible to provide sufficient improvements in square ratio and orientability. On the other hand, if the value exceeds the above-specified range, there is a possibility that the above-mentioned improvements in square ratio and orientability hardly can be expected. Further, there is a possibility that magnetic properties such as coercive force, saturated magnetization and saturated magnetic flux density are impaired disadvantageously.

The ferromagnetic powder of the present invention exhibits a very excellent dispersibility in a binding resin and excellent squareness ratio, orientability and electromagnetic conversion characteristics. In particular, magnetic powders which hardly can be dispersed in a binder resin, such as a cobalt-containing magnetic iron oxide powder and a magnetic barium ferrite iron oxide can be coated with the silica-alumina co-precipitate of the present invention to exhibit a high dispersibility.

In the present invention, the coating of the silica-alumina co-precipitate on the surface of ferromagnetic powder can be accomplished by various methods. For example, a water-soluble silicon compound and a water-soluble aluminum compound can be added to an aqueous slurry of ferromagnetic powder simultaneously or in any order. Alternatively, a fine co-precipitate of a mixture of both the water-soluble compounds can be added to such an aqueous slurry of ferromagnetic powder. This slurry then is neutralized, and optionally ripened. The temperature at which the processing is effected is normally not higher than boiling point, preferably 30° to 70° C. The atmosphere under which the processing is effected may be either non-oxidizing or oxidizing, preferably non-oxidizing.

Examples of the above-mentioned water-soluble silicon compound include sodium, potassium and cobalt salts of orthosilicic acid and metasilicic acid. Examples of the above-mentioned water-soluble aluminum compound include sodium aluminate, potassium aluminate, aluminum sulfate and aluminum chloride.

In the present invention, if a silica-alumina co-precipitate is coated on a cobalt-containing magnetic iron oxide powder obtained by coating cobalt or cobalt and other metallic compounds on acicular magnetic iron oxide grains, heat treatment may be effected before and/or after the coating to further improve the effects of the present invention. The heat treatment can be accomplished by various methods. For example, a wet cake obtained by filtering and washing a slurry coated with cobalt or cobalt and other metallic compounds may be subjected to heat treatment at a temperature of 60° to 250° C. in the presence of steam before being coated with a silica-alumina co-precipitate. Alternatively, a wet cake obtained by coating a silica-alumina coprecipitate on a slurry coated with cobalt or cobalt and other metallic compounds similarly may be subjected to heat treatment.

The binder to be incorporated in the present magnetic recording layer will be further described hereinafter.

Examples of the binder which can be incorporated in the present magnetic recording layer include known thermoplastic resins, thermosetting resins, radiation-curing resins and reactive resins which therefore have been used as binders for magnetic recording medium, and mixtures thereof.

Tg of such a resin is in the range of $-40°$ C. to 150° C. The weight-average molecular weight of such a resin is in the range of 10,000 to 300,000, preferably 10,000 to 100,000.

Examples of the above-mentioned thermoplastic resins include vinyl copolymers such as vinyl chloride-vinyl acetate copolymer, vinyl chloride, copolymer of vinyl acetate with vinyl alcohol, maleic acid and/or acrylic acid, vinyl chloride-vinylidene chloride copolymer, vinyl chloride-acrylonitrile copolymer and ethylene-vinyl acetate copolymer, cellulose derivatives such as nitrocellulose, cellulose acetate propionate and cellulose acetate butylate resins, rubber resins such as acrylic resin, polyvinyl acetal resin, polyvinyl butyral resin, polyester polyurethane resin, polyether polyurethane resin, polycarbonate polyurethane resin, polyester resin, polyether resin, polyamide resin, amino resin, styrenebutadiene resin and butadiene acrylonitrile resin, silicone resin and fluorine resin.

Preferred among the binders are vinyl chloride resins and cellulose derivatives, which exhibit a high dispersibility.

As a radiation-curing resin there can be used resins obtained by connecting a group having a carbon-carbon unsaturated bond as a radiation-curing functional group to the above-mentioned thermoplastic resin. Preferred examples of such a functional group include acryloyl group and methacryloyl group.

Polar groups (e.g., epoxy group, $CO_2M$, OH, $NR_2$, $NR_3X$, $SO_3M$, $OSO_3M$, $PO_3M_2$, $OPO_3M_2$ wherein M represents a hydrogen atom, alkaline metal or ammonium (if there are a plurality of M's, they may be the same or different); and R represents a hydrogen atom or alkyl group) may be incorporated in the molecule of these binders.

The above-mentioned high molecular binders may be used singly or in combination. The binders can be cured by the addition of a known isocyanate crosslinking agent and/or a radiation-curing vinyl monomer.

Further, as the binder to be incorporated in the magnetic recording layer, a hydrophilic binder also may be used.

As such hydrophilic binders there can be used a water-soluble polymer, cellulose ester, latex polymer, water-soluble polyester etc. as exemplified in Research Disclosure Nos. 17643, page 26, and 18716, page 651. Examples of water-soluble polymers include gelatin, gelatin derivative, casein, agar-agar, sodium alginate, starch, polyvinyl alcohol, polyacrylic acid copolymer and anhydrous maleic acid copolymer. Examples of cellulose ester include carboxymethyl cellulose and hydroxyethyl cellulose. Examples of latex polymers include vinyl chloride-containing copolymer, vinylidene chloride-containing copolymer, acrylic ester-containing copolymer, vinyl acetate-containing copolymer and butadiene-containing copolymer. Most preferred among the compounds is gelatin.

As gelatin there can be used any of the so-called alkali-treated (lime-treated) gelatin obtained by dipping in an alkaline bath before extraction of gelatin, acid-treated gelatin obtained by dipping in an acid bath before extraction of gelatin, double-dipped gelatin obtained by dipping in both baths before extraction of gelatin and enzyme-treated gelatin. If necessary, cellulose derivatives such as colloidal albumin, casein, carboxymethyl cellulose and hydroxyethyl cellulose, saccharide derivatives such as agar-agar, sodium alginate, starch derivative and dextran, synthetic hydrophilic colloids such as polyvinyl alcohol, poly-N-vinylpyrrolidone, polyacrylic acid copolymer, polyacrylamide, derivative thereof and partial hydrolyzate thereof, gelatin derivatives, etc can be used in place of part of gelatin.

As the binder, vinyl chloride-vinyl acetate copolymer, cellulose derivatives and gelatin are particularly preferred.

The weight ratio of the ferromagnetic powder to the binder is generally from 1:2 to 1:100, and preferably from 1:2 to 1:20.

The magnetic recording layer containing gelatin preferably may be hardened. Examples of film hardeners to be incorporated in the magnetic recording layer include aldehyde compounds such as formaldehyde and glutaraldehyde, ketone compounds such as diacetyl and cyclopentanediol, bis(2-chloroethylurea), 2-hydroxy-4,6-dichloro-1,3,5-triazine, compounds containing reactive halogen as described in U.S. Pat. Nos. 3,288,775 and 2,732,303, and in British Patents 974,723 and 1,167,207, divinylsulfone, 5-acetyl-1,3-diacryloylhexahydro-1,3,5-triazine, compounds containing reactive olefin as described in U.S. Pat. Nos. 3,635,718 and 3,232,763, and in British Patent 994,869, N-hydroxymethyl phthalimide, N-methylol compounds as described in U.S. Pat. Nos. 2,732,316 and 2,586,168, isocyanates as described in U.S. Pat. No. 3,103,437, aziridine compounds as described in U.S. Pat. Nos. 3,017,280 and 2,983,611, acid derivatives as described in U.S. Pat. Nos. 2,725,294 and 2,725,295, epoxy compounds as described in U.S. Pat. No. 3,091,537, and halogencarboxyaldehydes such as mucochloric acid. Examples of inorganic film hardeners include chromium alum, zirconium sulfate and carboxyl group-activated film hardeners as described in JP-B-56-12853, 58-32699 and 58-50699 (the term "JP-B" as used herein means an "examined Japanese patent publication"), in Belgium Patent 825,726, in JP-A-60-225148, 51-126125, and 52-54427, and in U.S. Patent 3,321,313.

The amount of the film hardener to be used is normally in the range of 0.01 to 30% by weight, preferably 0.05 to 20% by weight based on dried gelatin.

The thickness of the magnetic recording layer is in the range of 0.1 to 10 μm, preferably 0.2 to 5 μm, and more preferably 0.5 to 3 μm.

The magnetic recording layer is required to be photographically transparent such that the presence of the magnetic recording layer does not result in deterioration of photographic images such as deterioration in graininess and sharpness and the optical density of the magnetic recording layer is 1.0 or less. To satisfy these requirements, the ferromagnetic powder is added in an amount mentioned above.

The magnetic recording layer of the present invention preferably may be provided on the back surface of the light-sensitive material. The magnetic recording layer can be coated or printed on the back surface of the transparent support. A polymer solution comprising magnetized grains dispersed therein and a polymer solution for the preparation of a transparent support preferably may be casted together to prepare a transparent support comprising a magnetic recording layer. In the case, the two polymer compositions are preferably substantially the same.

The magnetic recording layer may exhibit effects of improving smoothness, adjusting curl, inhibiting electric charging and adhesion etc. in combination. Other functional layers may be provided to provide the functions. If necessary, the magnetic recording layer may be provided with an adjacent protective layer to improve its anti-flaw properties.

The back surface of the transparent support comprising a magnetic recording layer can be calendered to improve its smoothness and thus improve S/N ratio of magnetic signal. In the case, the calendering of the transparent support is effected before being coated with a light-sensitive layer.

The support material to be used in the present light-sensitive material is not limited specifically. As such a support material there can be used any plastic film. Preferred examples of such plastic films include cellulose derivatives (e.g., diacetyl, triacetyl, propiolal, butanoyl, acetylpropionyl, and acetate), polyamide, polycarbonate as described in U.S. Pat. No. 3,023,101, polyester (e.g., polyethylene terephalate, poly-1,4-cyclohexanedimethylene terephalate and polyethylene terephthalate) as described in JP-B-48-40414, polystyrene, polypropylene, polyethylene, polysulfon, polyallylate and polyetherimide. Particularly preferred among the plastic films are triacetylcellulose, and polyethylene terephthalate.

A plasticizer may be added in the supports to enhance flexibility. Specific examples of plasticizers to be incorporated in a cellulose ester include triphenyl phosphate, biphenyl diphenyl phosphate and dimethyl ethyl phosphate.

The supports may range widely depending on the kind of polymer used and the thickness can range from about 1 mm (sheet) to about 20 μm (thin film), depending on the usage, and is normally in the range of 50 to 300 μm.

The molecular weight of such a support polymer is preferably 10,000 or more, more preferably 20,000 to 800,000.

The supports may contain dyes for the purpose of neutralizing base tint, inhibiting light piping and halation etc.

To adhere firmly a photographic layer (e.g., light-sensitive silver halide emulsion layer, interlayer, filter layer and transparent magnetic recording layer of the present invention) to the supports, the supports may be subjected to surface activation treatment such as chemical treatment, mechanical treatment, corona discharge, flame treatment, ultraviolet treatment, high frequency treatment, glow discharge, activated plasma treatment, laser treatment, mixed acid treatment and ozone treatment, and then directly coated with a photographic emulsion to obtain a sufficient adhesion. Alternatively, the supports may be provided with a subbing layer after or without being subjected to such a surface treatment and then coated with a photographic emulsion layer.

To provide a subbing layer, a gelatin solution comprising an organic solvent of a mixture of methylene chloride, ketone and alcohol may be coated on a cellulose derivative in a single layer.

Examples of gelatin hardeners include chromium salts (e.g., chromium alum), aldehydes (e.g., formaldehyde and glutaraldehyde), isocyanates, active halogen compounds (e.g., 2,4-dichloro-6-hydroxy-s-triazine) and epichlorohydrin resins. The subbing layer solutions may contain various additives as necessary. Examples of the additives include a surface active agent, antistatic agent, antihalation agent, coloring dye, pigment, coating aid and fog inhibitor. The subbing layer solution to be used in the present invention may contain an etching agent such as resorcin, chloral hydrate and chlorophenol.

The subbing layer of the present invention may contain finely divided grains of inorganic material such as $SiO_2$ and $TiO_2$ or finely divided grains of polymethyl methacrylate copolymer (1 to 10 $\mu$m) as a matting agent.

The coating of the subbing layer of the present invention can be accomplished by a well-known coating method such as dip coating process, air knife coating process, curtain coating process, roller coating process, wire bar coating process, gravure coating process and extrusion coating process using hopper as described in U.S. Pat. No. 2,681,294. If necessary, two or more layers may be simultaneously coated by any suitable method as described in U.S. Pat. Nos. 2,761,791, 3,508,947, 2,941,898 and 3,526,528, and in Yuji Harasaki, "Coating Engineering", page 253, Asakura Shoten, 1973.

The photographic light-sensitive material of the present invention will be described further hereinafter.

The light-sensitive material of the present invention comprises a silver halide emulsion layer, a back layer, a protective layer, an interlayer and an antihalation layer. The layers are formed mainly of hydrophilic colloid.

Examples of binder to be incorporated in the hydrophilic colloidal layer include protein such as gelatin, colloidal albumin and casein, cellulose compound such as carboxymethyl cellulose and hydroxyethyl cellulose, saccharide derivative such as agar-agar, sodium alginate and starch derivative, synthetic hydrophilic colloid such as polyvinyl alcohol, poly-N-vinylpyrrolidone, polyacrylic acid copolymer, polyacrylamide and derivatives thereof and partial hydrolyzates, dextran, vinyl polyacetate, ester polyacrylate and rosin. If necessary, two or more of the colloids may be used in an admixture.

Among the binders, gelatin or its derivatives are used most often. Examples of gelatin include the so-called lime-treated gelatin, acid-treated gelatin and enzyme-treated gelatin.

In the present invention, an anionic, nonionic, cationic or betainic fluorine-containing surface active agent may be used in combination.

Examples of such a fluorine-containing surface active agent are described in JP-A-49-10722, 53-84712, 54-14224, 50-113221, 55-149938, 54-48520, 54-14224, 58-200235, 57-146248 and 58-196544, in U.S. Pat. Nos. 4,335,201 and 4,347,308, in British Patents 1,417,915 and 1,439,402, and in JP-B-52-26687, 57-26719 and 59-38573.

Preferred examples of these fluorine-containing surface active agents are set forth below:

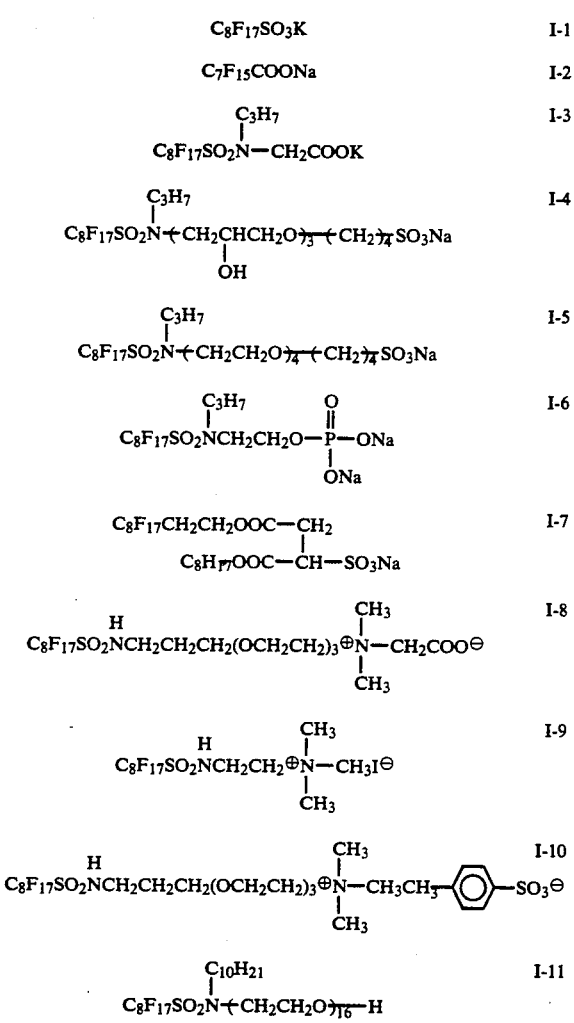

In the present invention, nonionic surface active agents may be used.

Specific examples of nonionic surface active agents which preferably can be used in the present invention are set forth below:

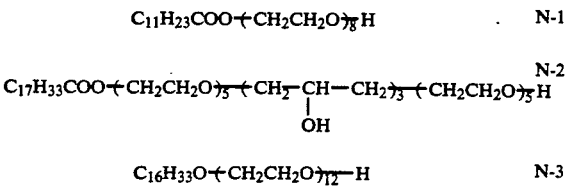

-continued

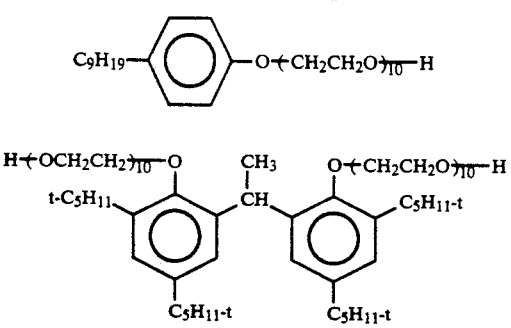

The layer in which the fluorine-containing surface active agent and nonionic surface active agent of the present invention is incorporated is not limited specifically so long as it is at least one layer in the photographic light-sensitive material and may be a surface protective layer, emulsion layer, interlayer, subbing layer, back layer or the like.

The amount of the fluorine-containing surface active agent or nonionic surface active agent to be used in the present invention preferably may be in the range of 0.001 g to 1 g, more preferably 0.0005 g to 0.5 g, and particularly 0.0005 to 0.2 g per $m_2$. Two or more of the surface active agents of the present invention may be used in an admixture.

Further, a polyol compound such as ethylene glycol, propylene glycol and 1,1,1-trimethylol propane or a polyol compound as disclosed in JP-A-54-89626 may be incorporated in the present protective layer or other layers.

Other known surface active agents may be incorporated in the present photographic constituting layers, singly or in combination. The surface active agents normally are used as coating aids but may be often used for other purposes, e.g., emulsion dispersion, sensitization and improvement of photographic properties.

In the present invention, a lubricating composition such as modified silicone as disclosed in U.S. Pat. Nos. 3,079,837, 3,080,317, 3,545,970 and 3,294,537, and in JP-A-52-129520 may be incorporated in photographic constituting layers. Further, a higher aliphatic ester can be incorporated effectively in photographic constituting layers.

The photographic light-sensitive material of the present invention can comprise a polymer latex as described in U.S. Pat. Nos. 3,411,911 and 3,411,912, and in JP-B-45-5331 in photographic constituting layers.

The silver halide emulsion layer and other hydrophilic colloidal layers in the photographic light-sensitive material of the present invention can be cured with various organic or inorganic curing agents, singly or in combination.

Typical examples of silver halide color photographic materials to which the present invention preferably can be applied include color reversal film and color negative film. In particular, general purpose color negative films are preferred color photographic light-sensitive materials.

The present invention will be further described with reference to general purpose color negative films.

The present silver halide color photographic light-sensitive material can comprise at least one blue-sensitive layer, at least one green-sensitive layer and at least one red-sensitive layer on a support. The number of silver halide emulsion layers and light-insensitive layers and the order of arrangement of the layers are not limited specifically. In a typical embodiment, the present silver halide photographic material comprises light-sensitive layers consisting of a plurality of silver halide emulsion layers having substantially the same color sensitivity and different light sensitivities on a support. The light-sensitive layers are unit light-sensitive layers having a color sensitivity to any of blue light, green light and red light. In the multi-layer silver halide color photographic material, these unit light-sensitive layers are normally arranged in the order of red-sensitive layer, green-sensitive layer and blue-sensitive layer as viewed from the support. However, the order of arrangement optionally can be reversed depending on the purpose of application. Alternatively, two unit light-sensitive layers having the same color sensitivity can be arranged with a unit light-sensitive layer having a different color sensitivity interposed therebetween.

Light-insensitive layers such as various interlayers can be provided between the silver halide light-sensitive layers and as the uppermost layer and lowermost layer.

The interlayers can comprise couplers, DIR compounds or the like as described in JP-A-61-43748, 59-113438, 59-113440, 61-20037 and 61-20038. The interlayers can comprise further a color stain inhibitor as used commonly.

The plurality of silver halide emulsion layers constituting each unit light-sensitive layer are described in West German Patent 1,121,470, in British Patent 923,045, in JP-A-57-112751, 62-200350, 62-206541, 62-206543, 56-25738, 62-63936 and 59-202464, and in JP-B-55-34932, and 49-15495.

Silver halide grains in the photographic emulsions may be so-called regular grains having a regular crystal form, such as cube, octahedron and tetradecahedron, or those having an irregular crystal form such as sphere and tablet, those having a crystal defect such as twinning plane, or those having a combination of the crystal forms.

The silver halide grains may be either fine grains of about 0.2 μm or smaller in diameter or giant grains having a projected area diameter or up to about 10 μm. The emulsion may be either a monodisperse emulsion or a polydisperse emulsion.

The preparation of the silver halide photographic emulsion which can be used in the present invention can be accomplished by any suitable method as described in Research Disclosure No. 17643 (December, 1978), pp. 22–23, "I. Emulsion Preparation and Types", and No. 18716 (November, 1979), page 648, P. Glafkides, "Chimie et Physique Photographique", Paul Montel (1967), G. F. Duffin, "Photographic Emulsion Chemistry", Focal Press, 1966, and V. L. Zelikman et al., "Making and Coating Photographic Emulsion Focal Press", 1964.

Furthermore, monodisperse emulsions as described in U.S. Pat. Nos. 3,574,628 and 3,655,394, and in British Patent 1,413,748 preferably can be used in the present invention.

Tablet grains having an aspect ratio of about 5 or more can be used in the present invention. The preparation of such tablet grains can be accomplished easily by any suitable method as described in Gutoff, "Photograpahic Science and Engineering", vol. 14, pp. 248–257, 1970, in U.S. Pat. Nos. 4,434,226, 4,414,310, 4,433,048 and 4,439,520, and in British Patent 2,112,157.

The individual silver halide crystals may have either a homogeneous structure or a heterogeneous structure composed of a core and an outer shell differing in halogen composition or may have a layered structure. Furthermore, the grains may have fused thereto a silver halide having a different halogen composition or a compound other than silver halide, e.g., silver thiocyanate, lead oxide etc. by an epitaxial junction.

Mixtures of grains having various crystal forms also may be used.

The silver halide emulsion to be used in the present invention normally is subjected to physical ripening, chemical ripening and spectral sensitization. The effectiveness of the present invention become remarkable particularly when an emulsion sensitized with a gold compound and a sulfur-containing compound is used. Additives to be used in the steps are described in Research Disclosure Nos. 17643 and 18716 as tabulated below.

Known photographic additives which can be used in the present invention also are described in the above cited two references as shown in the table.

| Kind of additive | RD17643 | RD18716 |
|---|---|---|
| 1. Chemical sensitizer | p. 23 | p. 648 RC* |
| 2. Sensitivity increasing agent | | p. 648 RC* |
| 3. Spectral sensitizer and supersensitizer | pp. 23-24 | p. 648 RC-p. 649 RC |
| 4. Brightening agent | p. 24 | |
| 5. Antifoggant and stabilizer | pp. 24-25 | p.649 RC- |
| 6. Light absorbent, filter dye, and ultraviolet absorbent | pp. 25-26 | p. 649 RC-p. 650 LC* |
| 7. Stain inhibitor | p. 25 RC | p. 650 LC-RC |
| 8. Dye image stabilizer | p. 25 | |
| 9. Hardening agent | p. 26 | p. 651 LC |
| 10. Binder | p. 26 | p. 651 LC |
| 11. Plasticizer and lubricant | p. 27 | p. 650 RC |
| 12. Coating aid and surface active agent | pp. 26-27 | p. 650 RC |

*RC and LC as used above mean "right column" and "light column", respectively.

To inhibit deterioration in photographic properties due to formaldehyde gas, a compound capable of reacting with and solidifying formaldehyde as disclosed in U.S. Pat. Nos. 4,411,987 and 4,435,503 preferably can be incorporated in the light-sensitive material.

In the present invention, various color couplers can be used. Specific examples of the color couplers are described in the patents described in the above cited Research Disclosure No. 17643, VII-C to G.

The incorporation of the couplers in the light-sensitive material can be accomplished by any suitable known dispersion method.

Specific examples of high boiling solvents having a boiling point of 175° C. or higher under normal pressure to be used in the oil-in-water dispersion process include phthalic ester, phosphoric ester, phosphonic ester, benzoic ester, amide, alcohol, phenol, aliphatic carboxylic ester, aniline derivative and hydrocarbon. As an auxiliary solvent there can be used an organic solvent having a boiling point of about 30° C. or higher, preferably 50° C. to about 160° C. Typical examples of such an organic solvent include ethyl acetate, butyl acetate, ethyl propionate, methyl ethyl ketone, cyclohexanone, 2-ethoxyethyl acetate and dimethylformamide.

The process and effects of the latex dispersion method and specific examples of latexes to be used in dipping are described in U.S. Pat. No. 4,199,363, West German Patent Application (OLS) 2,541,274, and 2,541,230.

In the present light-sensitive material, the total thickness of all hydrophilic colloidal layers on the emulsion side is preferably in the range of 28 μm or less. The film swelling rate ($T_{\frac{1}{2}}$) is preferably in the range of 30 seconds or less. In the present invention, the film thickness is determined after being stored at a temperature of 25° C. and a relative humidity of 55% for 2 days. The film swelling rate $T_{\frac{1}{2}}$, can be determined by a method known in the art, e.g., by means of a swellometer of the type as described in A. Green et al, "Photographic Science and Engineering", vol. 19, No. 2, pp. 124-129. $T_{\frac{1}{2}}$ is defined as the time taken until half the saturated film thickness is reached wherein the saturated film thickness is 90% of the maximum swollen film thickness reached when the light-sensitive material is processed with a color developer at a temperature of 30° C. over 195 seconds.

The film swelling rate $T_{\frac{1}{2}}$ can be adjusted by adding a film hardener to gelatin as binder or altering the ageing condition after coating. The percentage swelling of the light-sensitive material is preferably in the range of 150 to 400%. The percentage swelling can be calculated from the maximum swollen film thickness determined as described above in accordance with the equation: (maximum swollen film thickness−film thickness)/film thickness.

The color photographic light-sensitive material of the present invention can be developed in accordance with an ordinary method as described in RD Nos. 17643 (pp. 28-29) and 18716 (left column - right column on page 615).

The silver halide color light-sensitive material of the present invention may contain a color developing agent for the purpose of simplifying and expediting processing. Such a color developing agent preferably is used in the form of various precursors. Examples of such precursors include indoaniline compounds as described in U.S. Pat. No. 3,342,597, Schiff's base type compounds as described in U.S. Pat. No. 3,342,599, and in Research Disclosure Nos. 14,850 and 15,159, and those as described in RD 13,924.

The light-sensitive material of the present invention is preferably in the form of roll film to the transparent recording layer of which signal can be input easily during transfer in camera or printer. In the roll film, the area of image exposure portion per frame is preferably in the range of 350 mm$^2$ to 1,200 mm$^2$, and the magnetically data recordable space is preferably 15% or more of the area of image exposure portion per frame. Specifically, the number of perforations per image plane is less than that of 135 format. In particular, the number of perforations per frame is preferably 4 or less.

Data can be input optically to the magnetically data recordable space by means of a light-emitting element such as a LED. Magnetic data and optical data are preferably input to the space one upon another. The magnetic recording format preferably is provided in accordance with the system disclosed in World Patent Disclosure 90-04205.

If the light-sensitive material of the present invention is used in the form of roll, it is housed preferably in a cartridge. The most commonly used cartridge is the existing 135 format patrone. In addition, there can be used cartridges as proposed in JP-A-U-58-67329 and 58-195236 (the term "JP-A-U" as used herein means an "unexamined published Japanese utility model application"), in JP-A-58-181035 and 58-182634, in U.S. Pat. Nos. 4,221,479, 4,846,418, 4,848,693 and 4,832,275, in Japanese Patent Application Nos. 63-183344 and 1-21862, and in JP-A-1-231045, 2-170156, 2-205843, 2-210346, 2-199451, 2-201441, 2-214853, 2-211443, 2-264248, 3-37646, 3-37645 and 2-124564.

A cartridge with a means for controlling the position thereof in a camera particularly is preferred (Japanese Patent Application No. 1-214895).

The cartridge to be used in the present invention is composed mainly of a synthetic plastic.

In the molding of the present plastic, a plasticizer is optionally blended in the plastic. Typical examples of such a plasticizer include trioctyl phosphate, tributyl phosphate, dibutyl phthalate, diethyl sebacate, methyl amyl ketone, nitrobenzene, r-valerolactone, di-n-octylsuccinate, bromonaphthalene, and butyl palmitate.

Specific examples of plastic materials to be used in the present invention are set forth below, but the present invention should not be construed as being limited thereto.

Specific examples of such plastic materials include polystyrene, polypropylene, polymonochlorotrifluoroethylene, vinylidene chloride resin, vinyl chloride resin, vinyl chloride-vinyl acetate copolymer resin, acrylonitrile-butadiene-styrene copolymer resin, methyl methacrylate resin, vinyl formal resin, vinyl butyral resin, polyethylene terephthalate, Teflon, nylon, phenolic resin and melamine resin.

Particularly preferred among the plastic materials are polystyrene, polyethylene and polypropylene.

The present cartridge may contain various antistatic agents. The antistatic agents are not limited specifically. As antistatic agents there preferably may be used carbon black, metal oxide grains of the present invention, nonionic, anionic, cationic and betainic surface active agents, and nonionic, anionic, cationic and betainic polymers. Such antistatic cartridges are described further in JP-A-1-312537, and 1-312538.

In general, the cartridge is prepared from a plastic in which carbon black or pigment has been incorporated to give light screening.

The size of the cartridge may be left unchanged from the current 25 mm in diameter or may be reduced to 22 mm or less, preferably 14 mm to 20 mm in diameter effective for miniaturization of a camera. In the current cartridge, the spool protrudes on the side engaging with the camera's film driving portion, preventing the miniaturization of a camera. Therefore, it is desired to eliminate the protrusion. As a result, the volume of the current cartridge (about 35 cm$^3$) can be reduced. The volume of the cartridge preferably is reduced to 30 cm$^3$ or less, preferably 25 cm$^3$ or less, and more preferably 20 cm$^3$ or less. The total weight of the plastic to be used for the cartridge and the cartridge case is in the range of 1 g to 25 g, preferably 5 g to 15 g.

The ratio of the internal volume of the cartridge case to the volume of the plastic to be used for the cartridge and cartridge case is in the range of 4 to 0.7, preferably 3 to 1.

In the case of 135 color light-sensitive material built-in cartridge, the total weight of the plastic to be used for the cartridge and cartridge case is normally in the range of 1 g to 25 g, preferably 5 g to 15 g.

The form of the color light-sensitive material built-in cartridge of the present invention are described hereinafter.

The form of the cartridge of the present invention is not limited specifically and preferably fits to commercial cameras. Alternatively, the cartridge of the present invention may be used with a camera to which it fits.

The present invention will be further described in the following examples, but the present invention should not be construed as being limited thereto.

EXAMPLE 1

1-1) Preparation of magnetic powder comprising silica-alumina co-precipitate Preparation of magnetic powder A 100 g of acicular $\gamma$-Fe$_2$O$_3$ (coercive force (Hc): 405 Oe; specific surface area: 31 m$^2$/g; axial ratio (L/W): 10/1) was dispersed in a 1 mol/l aqueous solution of NaOH to obtain a 100 g/l slurry. 59 ml of a 1 mol/l aqueous solution of cobalt sulfate and 125 ml of a 1 mol/l aqueous solution of ferrous sulfate were added to the slurry with N$_2$ bubbled thereinto The slurry then was stirred at room temperature (30° C.) for 5 hours. The slurry was filtered off and then washed with water to obtain 230 g of a wet cake of cobalt-containing magnetic iron oxide. The wet cake then was dispersed in water to obtain a 100 g/l slurry. The slurry then was heated to a temperature of 45° C. with N$_2$ bubbled thereinto. 3.6 ml of an aqueous solution of sodium aluminate (Al$_2$O$_3$/Na$_2$O molar ratio: 0.75: Al$_2$O$_3$ content: 50 g/l ) was added to the slurry with stirring. Subsequently, 6.4 ml of an aqueous solution of sodium orthosilicate (SiO$_2$/Na$_2$O molar ratio: 0.5; SiO$_2$ content: 50 g/l) was added to the slurry with stirring in an amount of 0.32% and 0.18% as calculated in terms of SiO$_2$ and Al$_2$O$_3$ based on the weight of iron oxide, respectively. Diluted sulfuric acid then was added to the slurry so that the slurry was neutralized to pH 7.5. The slurry was stirred further for 30 minutes for ripening.

The slurry thus coated with silica-alumina co-precipitate was filtered off and washed to obtain a wet cake. The wet cake then was subjected to N$_2$ substitution together with water in another vessel in an autoclave. The wet cake was sealed and then subjected to heat treatment at a temperature of 130° C. in the presence of steam for 6 hours. The material then was dried at a temperature of 60° C. for 8 hours to obtain the present magnetic powder A.

Preparation of magnetic powder B

Magnetic powder B of the present invention was prepared in the same manner as in magnetic powder A except that the amount of aqueous solution of sodium orthosilicate and aqueous solution of sodium aluminate to be incorporated were altered to 0.64% and 0.36% as calculated in terms of SiO$_2$ and Al$_2$O$_3$ based on the weight of iron oxide, respectively.

Preparation of magnetic powder C

Magnetic powder C. of the present invention was prepared in the same manner as in magnetic powder A except that the coating of silica-alumina co-precipitate on the wet cake of cobalt-containing iron oxide was effected after heat treatment with steam.

Preparation of magnetic powder D

Magnetic powder D of the present invention was prepared in the same manner as in magnetic powder A except that as magnetic iron oxide powder there was used $\gamma$-$Fe_2O_3$ powder having a coercive force (Hc) of 341, a specific surface area of 31 $m^2$/g and an axial ratio (L/W) of 10:1.

Preparation of magnetic powder E

Magnetic powder E was prepared in the same manner as in magnetic powder A except that the addition of aqueous solution of sodium orthosilicate and aqueous solution of sodium aluminate was not effected.

Preparation of magnetic powder F

Magnetic powder F was prepared in the same manner as in magnetic powder A except that the addition of aqueous solution of sodium orthosilicate was not effected.

Preparation of magnetic powder G

Magnetic powder G was prepared in the same manner as in magnetic powder A except that the addition of aqueous solution of sodium aluminate was not effected.

Preparation of magnetic powder H

Magnetic powder H was prepared in the same manner as in magnetic powder D except that the addition of aqueous solution of sodium orthosilicate and aqueous solution of sodium aluminate was not effected.

1-2) Preparation of base

Cellulose triacetate dope solutions comprising magnetic powders A to H thus prepared dispersed therein and cellulose triacetate dope solutions were casted together to prepare 122-$\mu$m thick film bases having a 2-$\mu$m transparent magnetic recording layer thereon. In all the specimens, the coated amount of magnetic powder was 0.14 g/$m^2$. As control, bases free of magnetic powder were together casted to prepare Specimen I.

| Magnetic powder | 1.1 wt % |
| --- | --- |
| Cellulose triacetate | 18 wt % |
| Methylene chloride | 72.8 wt % |
| Triphenylphosphate | 2.9 wt % |
| Methanol | 6.3 wt % |

*) Composition of the cellulose triacetate dope solution containing each of magnetic powders A back layer having the following composition was coated on the magnetic recording layer side of these bases to prepare bases for light-sensitive material.

| (Structure of back layer) | |
| --- | --- |
| 1st layer: | |
| Cellulose triacetate | 0.1 g/$m^2$ |
| Ethylene glycol | 0.08 g/$m^2$ |
| $SnO_2$/$Sb_2O_3$/$SiO_2$(90/10/0.5; mean grain diameter: 0.15 $\mu$m) | 0.18 mg/$m^2$ |
| 2nd layer: | |
| Cellulose diacetate | 0.32 g/$m^2$ |
| Aerosil | 0.02 g/$m^2$ |
| Dimethyl silicone | 0.01 g/$m^2$ |
| Matting agent (Poly(methylmethacrylate/divinylbenzene) (polymerization molar ratio: 90:10; mean grain diameter: 2.5 $\mu$m)) | 0.01 g/$m^2$ |

1-3) Preparation of light-sensitive material

Cellulose triacetate film supports A to I thus undercoated were subjected to corona discharge on the side of the support opposite to the back layer, and then coated with various layers having the compositions as described in Example 1 in JP-A-2-93641 in layers to prepare multilayer color light-sensitive material specimens.

1-4) Working of specimens

The specimens were then cut and worked into 24-frame films having the format. The specimens were then developed in the following manner:

| Color development | 3 min. 15 sec. |
| --- | --- |
| Bleach | 6 min. 30 sec. |
| Washing | 2 min. 10 sec. |
| Fixing | 4 min. 20 sec. |
| Washing | 3 min. 15 sec. |
| Stabilizing | 1 min. 05 sec. |

The various processing solutions had the following compositions:

| Color developer | |
| --- | --- |
| Diethylenetriaminepentaacetic acid | 1.0 g |
| 1-Hydroxyethylidene-1,1-diphosphonic acid | 2.0 g |
| Sodium sulfite | 4.0 g |
| Potassium carbonate | 30.0 g |
| Potassium bromide | 1.4 g |
| Potassium iodide | 1.3 g |
| Hydroxylamine sulfate | 2.4 g |
| 4-(N-ethyl-N-$\beta$-hydroxyethylamino)-2-methylaniline sulfate | 4.5 g |
| Water to make | 1.0 l |
| pH 10.0 | |
| Bleaching solution | |
| Ferric ammonium ethylenediaminetetraacetate | 100.0 g |
| Disodium ethylenediaminetetraacetate | 10.0 g |
| Ammonium bromide | 150.0 g |
| Ammonium nitrate | 10.0 g |
| Water to make | 1.0 l |
| pH 6.0 | |
| Fixing solution | |
| Disodium ethylenediaminetetraacetate | 1.0 g |
| Sodium sulfite | 4.0 g |
| 70% Aqueous solution of ammonium thiosulfate | 175.0 ml |
| Sodium bisulfite | 4.6 g |
| Water to make | 1.0 l |
| pH 6.6 | |
| Stabilizing solution | |
| 40% Formalin | 2.0 ml |
| Polyoxyethylene-p-monononylphenyl ether (mean polymerization degree: 10) | 0.3 g |
| Water to make | 1.0 l |

The evaluation of the specimens is described hereinafter.

The specimens thus obtained were evaluated for coercive force (Hc), squareness ratio (Br/Bm), orientability (OR) and reversed magnetic field distribution (SFD) by a sample vibration type magnetic meter (VSM P10-15 AUTO, made by Touei Kogyo K. K.). These specimens also were evaluated for glossiness, transmission and photographic image properties in the following manner:

Measurement of glossiness

Specimens which had not been exposed to light were developed and fixed in the above-mentioned manner, and then measured for glossiness. As measuring instrument there was used VG-Σ80 available from Nihon Denshoku Kogyo K. K. The measurement was effected on the back layer side.

Measurement of transmission

Specimens which had not been exposed to light were developed and fixed in the above-mentioned manner, and then measured for total light transmission. The light transmission values are represented relative to that of Specimen I (control) taken as 100. The measurement of the total light transmission was effected in accordance with ASTM D-1003. The results are set forth in Table 1.

Evaluation of photographic image properties

Specimens which had not been exposed to light were developed and fixed in the above-mentioned manner, and then printed out on B4 photographic paper (×12 enlargement). The degree of occurrence of deficiency and unevenness in prints due to unexposure was evaluated by the following four-step criteria:

A: No occurrence of deficiency and unevenness observed

B: Slight occurrence of deficiency and unevenness observed

C: Significant occurrence of deficiency and unevenness observed

D: Occurrence of deficiency and unevenness observed over almost all the surface

Among those items, squareness ratio, orientability, glossiness and reversed magnetic field distribution give indications of dispersibility. The greater the former three items are, the better the dispersibility. The lower the last item is, the better the dispersibility.

The results of the evaluation of the specimens prepared in Example 1 are set forth in Table 1.

TABLE 1

| Specimen No. | Hc (Oe) | Br/Bm | OR | SFD | Glossiness (%) | Photographic image formation | Transmission (%) |
|---|---|---|---|---|---|---|---|
| 1-A(present invention) | 691 | 0.810 | 2.01 | 0.442 | 89.0 | A | 77.0 |
| 1-B(present invention) | 666 | 0.824 | 2.20 | 0.447 | 87.0 | A | 76.2 |
| 1-C(present invention) | 749 | 0.833 | 2.18 | 0.410 | 89.5 | A | 82.0 |
| 1-D(present invention) | 413 | 0.815 | 2.16 | 0.383 | 85.0 | A | 77.5 |
| 1-E (comparative) | 658 | 0.747 | 1.62 | 0.511 | 70.2 | C | 69.0 |
| 1-F (comparative) | 611 | 0.762 | 1.69 | 0.486 | 68.1 | C | 69.5 |
| 1-G (comparative) | 650 | 0.751 | 1.80 | 0.455 | 66.6 | D | 72.1 |
| 1-H (comparative) | 375 | 0.757 | 2.01 | 0.401 | 72.2 | C | 69.2 |
| 1-I(control) | — | — | — | — | 160.2 | A | 92.0 |

Table 1 shows that Specimens 1-A to 1-D of the present invention exhibit higher squareness ratio, orientability and glossiness and lower reversed magnetic field distribution than Comparative Specimens 1-E to 1-H. The present specimens also exhibit excellent photographic image formation properties. Thus, the present invention provides a definite improvement in dispersibility of magnetic powder.

EXAMPLE 2

2-1) Preparation of support

A cellulose triacetate dope solution was casted to prepare a 105-μm thick film base.

The base then was provided with the following back layer on one side thereof. As cobalt-doped iron oxide magnetic powders there were used A to H as prepared in Example 1-1. Another specimen was prepared free of magnetic powder as Specimen I.

| 1st back layer: | |
|---|---|
| Cellulose triacetate | 0.1 g/m² |
| Ethylene glycol | 0.08 g/m² |
| SnO₂/Sb₂O₃/SiO₂(90/10/0.5 by weight) (mean grain diameter: 0.15 μm) | 0.18 mg/m² |
| 2nd back layer: | |
| Vinyl acetate/vinyl chloride polymer (50/50 by weight) (number average molecular weight: 13,000) | 2.5 g/m² |
| Cobalt-doped iron oxide magnetic powder | 0.2 g/m² |
| 3rd back layer: | |
| Polymethyl methacrylate | 0.32 g/m² |
| Aerosil | 0.02 g/m² |
| Poly(methylmethacrylate/divinylstyrene)(molar ratio: 95:5) (mean grain diameter: 0.2 μm) | 0.01 g/m² |
| C₃₈H₇₉COOC₄₀H₈₁ | 0.005 g/m² |

2-2) Preparation of light-sensitive material layer

Light-sensitive layers were provided on the side of the support prepared in 2-1) opposite to the back layer in the same manner as in Example 1-3).

The results of the evaluation of the specimens are set forth in Table 2.

TABLE 2

| Specimen No. | Hc (Oe) | Br/Bm | OR | SFD | Glossiness (%) | Photographic image formation | Transmission (%) |
|---|---|---|---|---|---|---|---|
| 2-A(present invention) | 710 | 0.808 | 2.00 | 0.451 | 88.8 | A | 77.0 |
| 2-B(present invention) | 674 | 0.822 | 2.19 | 0.450 | 87.5 | A | 75.0 |
| 2-C(present invention) | 750 | 0.840 | 2.17 | 0.423 | 90.0 | A | 81.5 |
| 2-D(present invention) | 422 | 0.810 | 2.14 | 0.399 | 85.0 | A | 77.7 |
| 2-E (comparative) | 665 | 0.751 | 1.62 | 0.520 | 70.1 | D | 69.2 |
| 2-F (comparative) | 615 | 0.770 | 1.66 | 0.495 | 68.0 | C | 66.6 |
| 2-G (comparative) | 666 | 0.762 | 1.79 | 0.461 | 65.2 | D | 72.0 |
| 2-H (comparative) | 387 | 0.762 | 2.01 | 0.403 | 70.0 | C | 68.5 |
| 2-I(control) | — | — | — | — | 160.2 | — | 92.0 |

Table 2 shows that Specimens 2-A to 2-D of the present invention exhibit higher squareness ratio, orientability and glossiness and lower reversed magnetic field distribution than Comparative Specimens 2-E to 2-H. The present specimens also exhibit excellent photographic image formation properties. Thus, the present invention provides a definite improvement in dispersibility of magnetic powder.

EXAMPLE 3

A support with a back layer was prepared in the same manner as in Example 2-1) except that the thickness of cellulose triacetate was altered to 115 μm. The side of the support opposite to the back layer then was coated with reversal color emulsion layers as incorporated in Specimen 101 in Example 1 in JP-A-2-854. The development was effected using color reversal processing CR-56 (made by Fuji Photo Film Co., Ltd.). The results of the evaluation of the specimens are set forth in Table 3.

TABLE 3

| Specimen No. | Hc (Oe) | Br/Bm | OR | SFD | Glossiness (%) | Photographic image formation | Transmission (%) |
|---|---|---|---|---|---|---|---|
| 3-A(present invention) | 708 | 0.808 | 2.01 | 0.455 | 86.0 | A | 80.1 |
| 3B(present invention) | 672 | 0.820 | 2.20 | 0.450 | 87.0 | A | 79.7 |
| 3-C(present invention) | 749 | 0.840 | 2.16 | 0.414 | 92.0 | A | 82.2 |
| 3-D(present invention) | 421 | 0.813 | 2.12 | 0.400 | 84.4 | B | 76.1 |
| 3-E (comparative) | 666 | 0.755 | 1.61 | 0.525 | 70.6 | C | 69.2 |
| 3-F (comparative) | 614 | 0.772 | 1.65 | 0.500 | 67.6 | C | 67.2 |
| 3-G (comparative) | 668 | 0.759 | 1.79 | 0.480 | 65.6 | D | 71.3 |
| 3-H (comparative) | 384 | 0.761 | 2.01 | 0.475 | 71.1 | C | 68.6 |
| 3-I(control) | — | — | — | — | 160.2 | — | 92.0 |

Table 3 shows that Specimens 3-A to 3-D of the present invention exhibit higher squareness ratio, orientability and glossiness and lower reversed magnetic field distribution than Comparative Specimens 3-E to 3-H. The present specimens also exhibit excellent photographic image formation properties. Thus, the present invention provides a definite improvement in dispersibility of magnetic powder.

EXAMPLE 4

4-1) Preparation of support

A polyethylene terephthalate film was stretched monoaxially. On both surfaces of the film were coated an aqueous dispersion of poly(vinylidene/acrylonitrile/itaconic acid (molar ratio: 92:5:3) (content after stretching: 1.5 g/m$^2$), sodium dodecylbenzensulfonate (2 mg/m$^2$), silica grains (mean grain diameter: 0.3 μm; 20 mg/m$^2$), polystyrene grains (mean grain diameter: 1.0 μm; 2 mg/m$^2$), 2-hydroxy-4,6-dichloro-1,3,5-triazine (35 mg/m$^2$) and trimethylol propane triaziridine (10 mg/m$^2$). The film then was again stretched during drying to prepare a support with a vinylidene chloride layer as a 1st subbing layer. The thickness of the polyethlene terephthalate film was 90 μm.

The support then was subjected to corona discharge on both surfaces thereof. On the 1st back layer of the support were coated gelatin (0.2 g/m$^2$), polyoxyethylene dodecyl ether (polymerization degree: 10)(2 mg/m$^2$) and (CH$_2$=CH-SO$_2$NHCH$_2$-$_2$ (10 mg/m$^2$) to provide a 2nd subbing layer thereon.

4-2) Preparation of back surface

The undercoated support prepared in 4-1) was coated with the following back layer on one surface thereof.

As cobalt-doped iron oxide magnetic powders there were used A to H as prepared in Example 1-1. Another specimen was prepared free of magnetic powder as Specimen I.

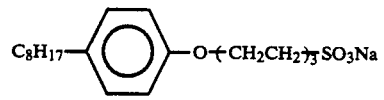

a) 1st back layer:
| | |
|---|---|
| Cobalt-doped ion oxide fine powder (used in the form of gelatin dispersion; mean grain diameter: 0.08 μm) | 0.2 g/m$^2$ |
| Gelatin | 3 g/m$^2$ |
| (CH$_2$=CHSO$_2$NHCH$_2$CH$_2$NH)$_{\overline{2}}$CO | 0.1 g/m$^2$ |
| C$_8$H$_{17}$—⟨ ⟩—O(CH$_2$CH$_2$)$_{\overline{3}}$SO$_3$Na | 0.02 g/m$^2$ |
| Poly(ethylacrylate) (mean grain diameter: 0.08 μm) | 1 g/m$^2$ | b) 2nd back layer:
| | |
|---|---|
| Gelatin | 0.05 g/m$^2$ |
| SnO$_2$/Sb$_2$O$_3$ (9:1; grain diameter: 0.15 μm) | 0.16 g/m$^2$ |
| Sodium dodecylbenzenesulfonate | 0.05 g/m$^2$ | c) 3rd back layer:
| | |
|---|---|
| Gelatin | 0.5 g/m$^2$ |
| Polymethyl methacrylate (mean grain diameter: 1.5 μm) | 0.02 g/m$^2$ |
| Ethyl stearate (dispersed in sodium dodecylbenzenesulfonate) | 0.01 g/m$^2$ |
| Sodium di(2-ethylhexyl) sulfosuccinate | 0.01 g/m$^2$ |
| Fluorine-containing surface active agent (I-9) | 0.006 g/m$^2$ |

4-3) Preparation of emulsion layer surface

The side of supports A to I opposite to the back surface prepared in 4-2) were coated with emulsion layers as incorporated in light-sensitive material specimen 1 in Example 1 in JP-A-2-93641 in the same manner.

The development was effected in the same manner as in Example 1.

The specimens thus prepared were evaluated in the same manner as in Example 1. The results are set forth in Table 4.

TABLE 4

| Specimen No. | Hc (Oe) | Br/Bm | OR | SFD | Glossiness (%) | Photographic image formation | Transmission (%) |
|---|---|---|---|---|---|---|---|
| 4-A(present invention) | 695 | 0.811 | 1.99 | 0.424 | 90.0 | A | 78.0 |
| 4-B(present invention) | 670 | 0.823 | 2.15 | 0.433 | 87.0 | A | 77.0 |
| 4-C(present invention) | 750 | 0.840 | 2.17 | 0.420 | 91.0 | A | 82.5 |
| 4-D(present invention) | 415 | 0.805 | 2.12 | 0.400 | 84.6 | A | 76.5 |
| 4-E (comparative) | 660 | 0.750 | 1.66 | 0.525 | 70.1 | C | 69.0 |
| 4-F (comparative) | 611 | 0.768 | 1.70 | 0.490 | 69.0 | C | 70.0 |
| 4-G (comparative) | 660 | 0.755 | 1.75 | 0.460 | 66.6 | D | 72.5 |
| 4-H (comparative) | 382 | 0.761 | 1.99 | 0.430 | 71.7 | D | 68.0 |
| 4-I(control) | — | — | — | — | 160.2 | — | 92.0 |

Table 4 shows that Specimens 4-A to 4-D of the present invention exhibit higher squareness ratio, orientability and glossiness and lower reversed magnetic field distribution than Comparative Specimens 4-E to 4-H. The present specimens also exhibit excellent photographic image formation properties. Thus, the present invention provides a definite improvement in dispersibility of magnetic powder.

As can be seen in Tables 1 to 4, the photographic light-sensitive materials prepared from the present magnetic powder having silica-alumina co-precipitate thereon comprise magnetic powder uniformly dispersed in a magnetic recording layer and thus exhibit an excellent transparency free of deficiency and unevenness even upon the formation of photographic images.

While the invention has been described in detail and with reference to specific embodiments thereof, it will be apparent to one skilled in the art that various changes and modifications can be made therein without departing from the spirit and scope thereof.

I claim:

1. A silver halide photographic material comprising a silver halide emulsion layer on at least one side of a support, comprising at least one magnetic recording layer on at least one side of the support, said magnetic recording layer is transparent and comprises a ferromagnetic powder, a silica and alumina co-precipitate on the surface of the ferromagnetic powder, and a binder, wherein the total amount of said ferromagnetic powder and said silica and alumina co-precipitate on the surface thereof is from $4 \times 10^{-4}$ to 3 g per square meter of the support.

2. The silver halide photographic material of claim 1, wherein said photographic material is a color photographic light-sensitive material.

3. The silver halide photographic material of claim 1, wherein said ferromagnetic powder is ferromagnetic iron oxide fine powder, Co-doped ferromagnetic iron oxide fine powder, ferromagnetic chromium dioxide fine powder, ferromagnetic alloy fine powder or barium ferrite.

4. The silver halide photographic material of claim 2, wherein said ferromagnetic powder is ferromagnetic iron oxide fine powder, Co-doped ferromagnetic iron oxide fine powder, ferromagnetic chromium dioxide fine powder, ferromagnetic alloy fine powder or barium ferrite.

5. The silver halide photographic material of claim 1, wherein the weight ratio of said ferromagnetic powder to said binder is from 1:2 to 1:100.

6. The silver halide photographic material of claim 1, wherein said binder is selected from the group consisted of vinyl chloride-vinyl acetate copolymer, vinyl chloride, copolymer of vinyl acetate with vinyl alcohol, maleic acid and/or acrylic acid, vinyl chloride-vinylidene chloride copolymer, vinyl chloride-acrylonitrile copolymer, ethylene-vinyl acetate copolymer, nitrocellulose, cellulose acetate propionate, cellulose acetate butylate resins, acrylic resin, polyvinyl acetal resin, polyvinyl butyral resin, polyester polyurethane resin, polyether polyurethane resin, polycarbonate polyurethane resin, polyester resin, polyether resin, polyamide resin, amino resin, styrenebutadiene resin, butadiene acrylonitrile resin, silicone resins, fluorine resins, radiation-curing resins obtained by connecting a group having a carbon-carbon unsaturated bond to the above-mentioned resins, gelatin, gelatin derivative, casein, agar-agar, sodium alginate, starch, polyvinyl alcohol, polyacrylic acid copolymer, anhydrous maleic acid copolymer, carboxymethyl cellulose, hydroxyethyl cellulose, vinyl chloride-containing copolymer, vinylidene chloride-containing copolymer, acrylic ester-containing copolymer, vinyl acetate-containing copolymer and butadiene-containing copolymer.

7. The silver halide photographic material of claim 1, wherein the molar ratio of $Al_2O_3$ to $SiO_2$ in the silica and alumina co-precipitate is from 1:2 to 1:4.

8. The silver halide photographic material of claim 1, wherein the amount of the silica and alumina co-precipitate is 0.05 to 10 % as calculated in terms of $SiO_2$ and 0.03 to 9 % as calculated in terms of $Al_2O_3$ based on the weight of said magnetic powder.

9. The silver halide photographic material of claim 1, wherein the magnetic recording layer has a coercive force of 400 Oe or more.

* * * * *